(12) United States Patent
Sattelmayer

(10) Patent No.: US 6,202,402 B1
(45) Date of Patent: Mar. 20, 2001

(54) GAS-TURBINE CONSTRUCTION

(75) Inventor: Thomas Sattelmayer, Erding (DE)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 09/106,095

(22) Filed: Jun. 29, 1998

(30) Foreign Application Priority Data

Jun. 30, 1997 (DE) .............................................. 197 27 730

(51) Int. Cl.$^7$ ..................................................... F02C 7/10
(52) U.S. Cl. ........................................ 60/39.511; 60/723
(58) Field of Search ............................. 60/39.511, 39.06, 60/39.822, 723

(56) References Cited

U.S. PATENT DOCUMENTS

| Re. 30,629 | * | 6/1981 | Dawson ................................. 60/682 |
| 3,563,031 | | 2/1971 | Topouzian . |
| 3,797,231 | | 3/1974 | McLean . |
| 4,062,190 | | 12/1977 | Dawson . |
| 4,307,568 | * | 12/1981 | Hüller et al. ...................... 60/39.511 |
| 4,754,607 | * | 7/1988 | Mackay ................................. 60/723 |
| 4,875,436 | * | 10/1989 | Smith et al. ......................... 122/7 R |
| 5,453,003 | * | 9/1995 | Pfefferle .............................. 60/723 X |
| 5,512,250 | * | 4/1996 | Betta et al. .......................... 60/723 X |
| 5,518,697 | | 5/1996 | Betta et al. . |
| 5,634,784 | * | 6/1997 | Pfefferle et al. .................... 60/723 X |
| 5,685,156 | * | 11/1997 | Willis et al. ............................ 60/723 |
| 5,845,481 | * | 12/1998 | Briesch et al. ...................... 60/39.06 |
| 5,855,112 | * | 1/1999 | Bannai et al. ..................... 60/39.511 |

FOREIGN PATENT DOCUMENTS

| 1 077 821 | 3/1960 | (DE) . |
| 60003422 | 1/1985 | (JP) . |

* cited by examiner

*Primary Examiner*—Timothy S. Thorpe
*Assistant Examiner*—David J. Torrente
(74) *Attorney, Agent, or Firm*—Burns, Doane, Swecker & Mathis, L.L.P.

(57) ABSTRACT

Described are a gas-turbine construction and a method of operating this gas-turbine construction, having an air compressor, a heat exchanger connected downstream of the air compressor, a combustion chamber, and a turbine which can be driven by hot combustion gases and from which the combustion gases are fed to the heat exchanger for heating the compressed supply air coming from the air compressor.

The invention is distinguished by the fact that the heat exchanger and the combustion chamber are integrated in a common unit, and that fuel can be added to the supply air before entry into the unit, which fuel can be ignited catalytically in the form of an air/fuel mixture inside the unit, in which a catalyst is provided.

11 Claims, 4 Drawing Sheets

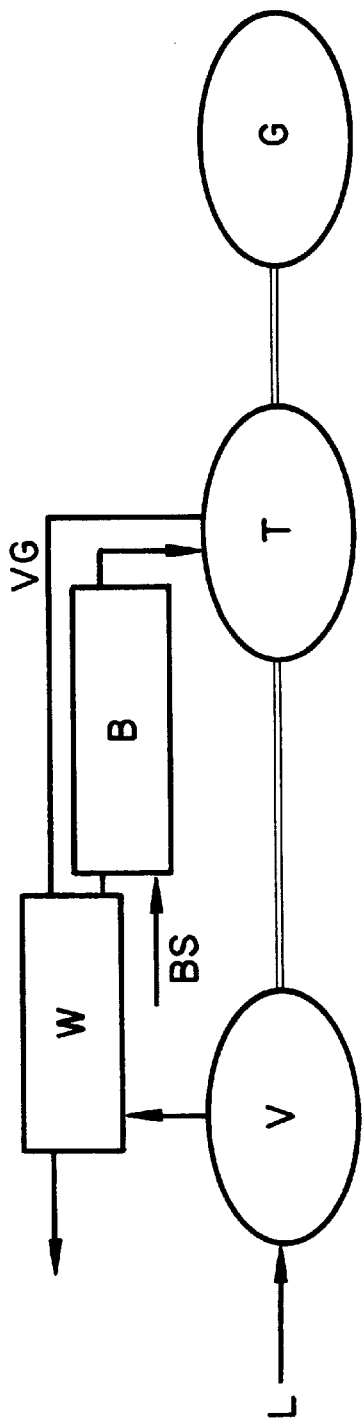
Fig. 1a — Prior Art —
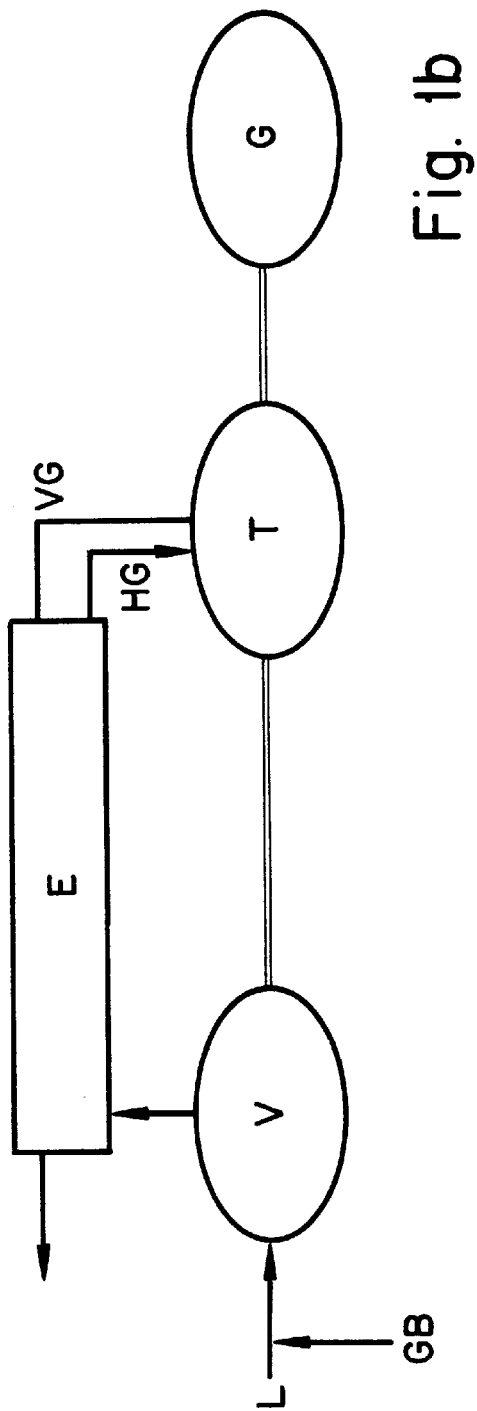
Fig. 1b

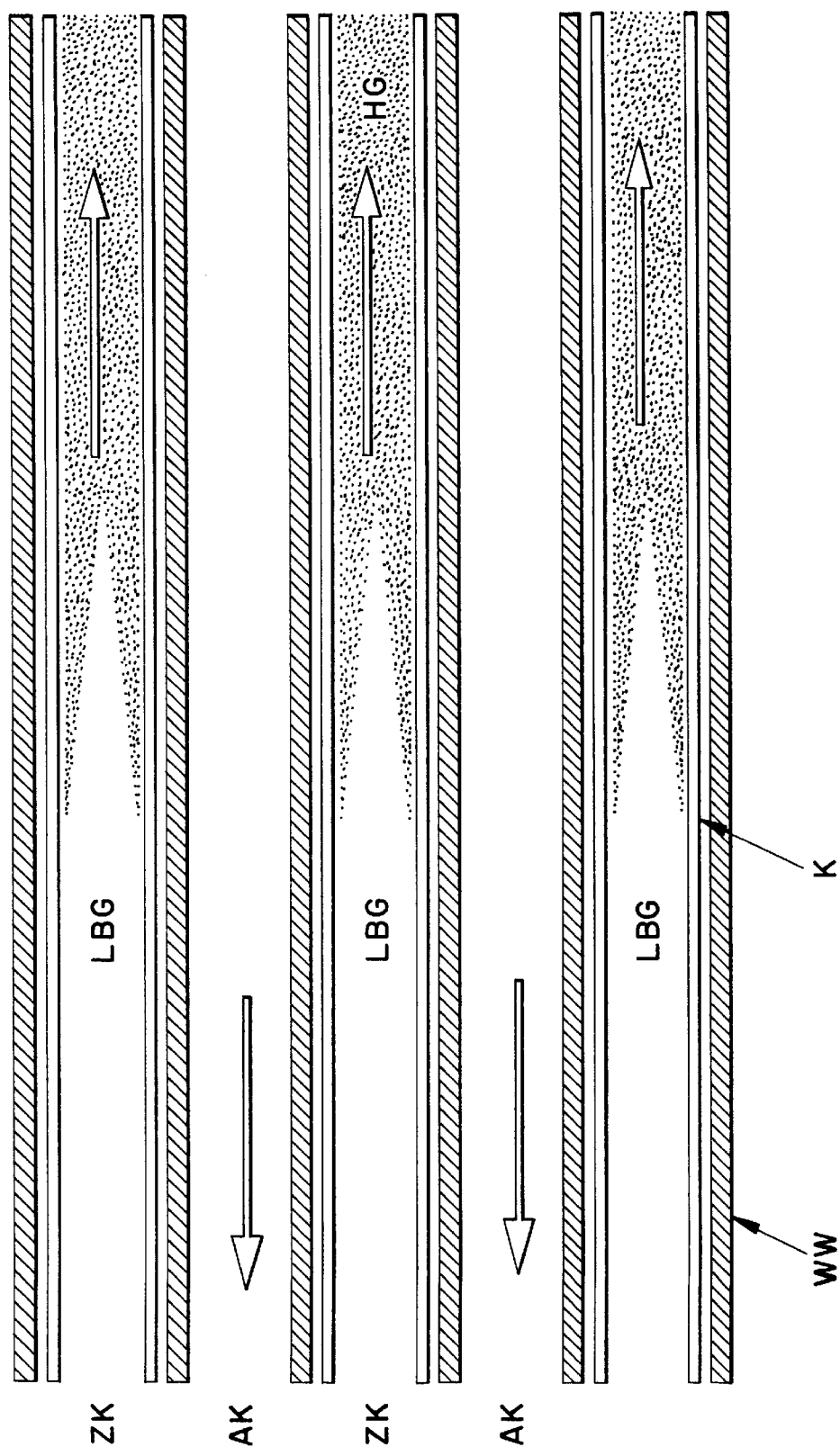

GAS-TURBINE CONSTRUCTION

BACKGROUND OF THE INVENTION

1. Field of the Invention

The invention relates to a gas-turbine construction having an air compressor, a heat exchanger connected downstream of the air compressor, a combustion chamber, and a turbine which can be driven by hot combustion gases and from which the combustion gases are fed to the heat exchanger for heating the compressed supply air coming from the air compressor.

2. Discussion of Background

Gas turbines, which are classified as heat engines, are operated with the combustion gases of liquid fuels. A typical gas-turbine construction, which is shown in FIG. 1a, has an air compressor V, also called turbocompressor, which draws in fresh air L, which is typically compressed to a pressure of 4 to 6 bar and is forced into a heat exchanger W, in which it is preheated by still hot combustion gases VG flowing from the turbine T. Finally, the preheated and compressed supply air passes together with fuels BS into the combustion chamber, in the course of which hot or combustion gases of at least 600° C. are produced. These combustion gases flow with great velocity into the turbine T and drive the latter, which is normally connected to a generator G for the generation of electricity.

The efficiency of a gas turbine is all the greater, the higher is the temperature of the combustion gases entering the turbine blades and the lower is the temperature of the exhaust gases escaping into the open from the gas turbine. Therefore the still hot combustion gases issuing from the turbine blades are nearly always directed through the heat exchanger, where they can give off their waste heat largely to the fresh air delivered by the compressor before said fresh air enters the combustion chamber.

A further advantage of the heat exchangers which are also known as recuperators consists in the fact that their thermodynamic optimum can be achieved at relatively low pressure ratios, as a result of which the turbine construction only needs a few turbine stages, so that the overall construction of a gas-turbine arrangement can be of relatively simple design.

However, the operation of heat exchangers at full load is problematic, since very hot combustion gases are formed by the very high temperatures arising in the combustion chamber, and these combustion gases lead to very intense air preheating inside the heat exchanger, as a result of which, however, reliable operation with low-pollutant premix combustion processes becomes difficult.

It has been found that an important component for the optimization of gas-turbine arrangements is the heat exchanger or recuperator, which makes a substantial contribution to the efficiency of such a machine.

In contrast to the conventional type of construction of a so-called tubular heat exchanger, which, however, only has a low power density, modern, compact heat exchangers usually consist of a stack of suitably shaped plates, which are arranged in layers one above the other and in this way form through-flow ducts through which the precompressed supply air and, in the opposite direction to the direction of flow of the supply air, the hot combustion gases flow alternately.

Since the specific output of a heat exchanger of plate-shaped design primarily depends on the characteristic length of the heat-exchanger element, plate-type heat exchangers having very fine ducts with high transfer capacity are being produced nowadays.

SUMMARY OF THE INVENTION

Accordingly, one object of the invention is to further optimize gas-turbine arrangements of the generic type in their power spectrum and in particular to simplify their construction. The operation of all the components and in particular the use of heat exchangers is also to be reliably ensured at high combustion-gas temperatures, in which case special attention is to be paid to compliance with corresponding exhaust-gas standards.

The achievement of the object of the invention is specified in claim 1. A method according to the invention of operating the gas-turbine construction specified in claim 1 is the subject matter of claim 11. Features advantageously developing the idea behind the invention are the subject matter of the subclaims.

According to the invention, a gas-turbine construction, having an air compressor, a heat exchanger connected downstream of the air compressor, a combustion chamber, and a turbine which can be driven by hot combustion gases and from which the combustion gases are directed in the heat exchanger for heating the compressed supply air coming from the air compressor, is developed in such a way that the heat exchanger and the combustion chamber are integrated in a common unit, and that fuel can be added to the supply air before entry into the unit, which fuel can be ignited catalytically in the form of an air/fuel mixture inside the unit, in which a catalyst is provided.

In contrast to conventional gas-turbine arrangements, in which, as described above, heat exchanger and combustion chamber form two separate units which are accordingly connected to one another via feed and discharge lines, the idea behind the invention is based on the combination of heat exchanger and combustion chamber. For this purpose, a plate-type heat exchanger known per se is preferably modified by the ducts which feed compressed air normally being surrounded or coated with a catalyst coating on the inside. Platinum is normally used as active material for the catalyst.

The plate-type heat exchanger modified in this way provides a multiplicity of through-ducts which are arranged one above the other in a stack and are composed alternately of ducts coated with catalyst material on the inside and of uncoated ducts enclosed by heat-exchanger walls.

For further simplification, the usually gaseous fuel is to be homogeneously admixed with the supply air upstream of the compressor unit, as a result of which the conventional gas compressor for compressing and injecting the fuel into the combustion chamber can be dispensed with.

The pressure ratios achievable in the compressor are to be set at such a low level that the temperatures achievable in the compressor rule out the possibility of self-ignition.

Of course, as an alternative to the admixing of the fuel with the supply air as described above, the injection, known per se, of the fuel into the compressed supply air downstream of the compressor is also possible.

According to the invention, the air/fuel mixture obtainable in this way is directed into the feeding ducts of the combination unit according to the invention, which ducts are lined with catalyst material and in which the air/fuel mixture is heated by thermal coupling to the hot combustion gases flowing through the unit in the opposite direction. The heating by the hot combustion gases, on account of their very high characteristic temperature, leads in the course of the duct to the ignition temperature of the air/fuel mixture being exceeded, as a result of which an ignited hot gas, which is passed directly into the turbine, is formed inside the duct.

According to the invention, it has been recognized that, for the combustion of the hot gases required for the operation of a turbine, the waste heat of the exhaust gases produced during the combustion is sufficient, with the use of a suitable catalyst, in order to ignite the air/fuel mixture.

As still to be explained below, the hot combustion gases, in addition to the heating effect over the range of the ignition temperature of the air/fuel mixture, can also help to cool the heat-exchanger/combustion-chamber combination according to the invention in order to thereby avoid uncontrolled heating of the unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1a shows a diagrammatic sketch of a gas-turbine arrangement according to the prior art, FIG. 1b shows a diagrammatic sketch of a gas-turbine arrangement according to the invention, FIG. 2 shows a schematic construction of an exemplary embodiment of the combination according to the invention of heat exchanger and combustion chamber.

DESCRIPTION OF THE PREFERRED EMBODIMENTS

Figure 3:
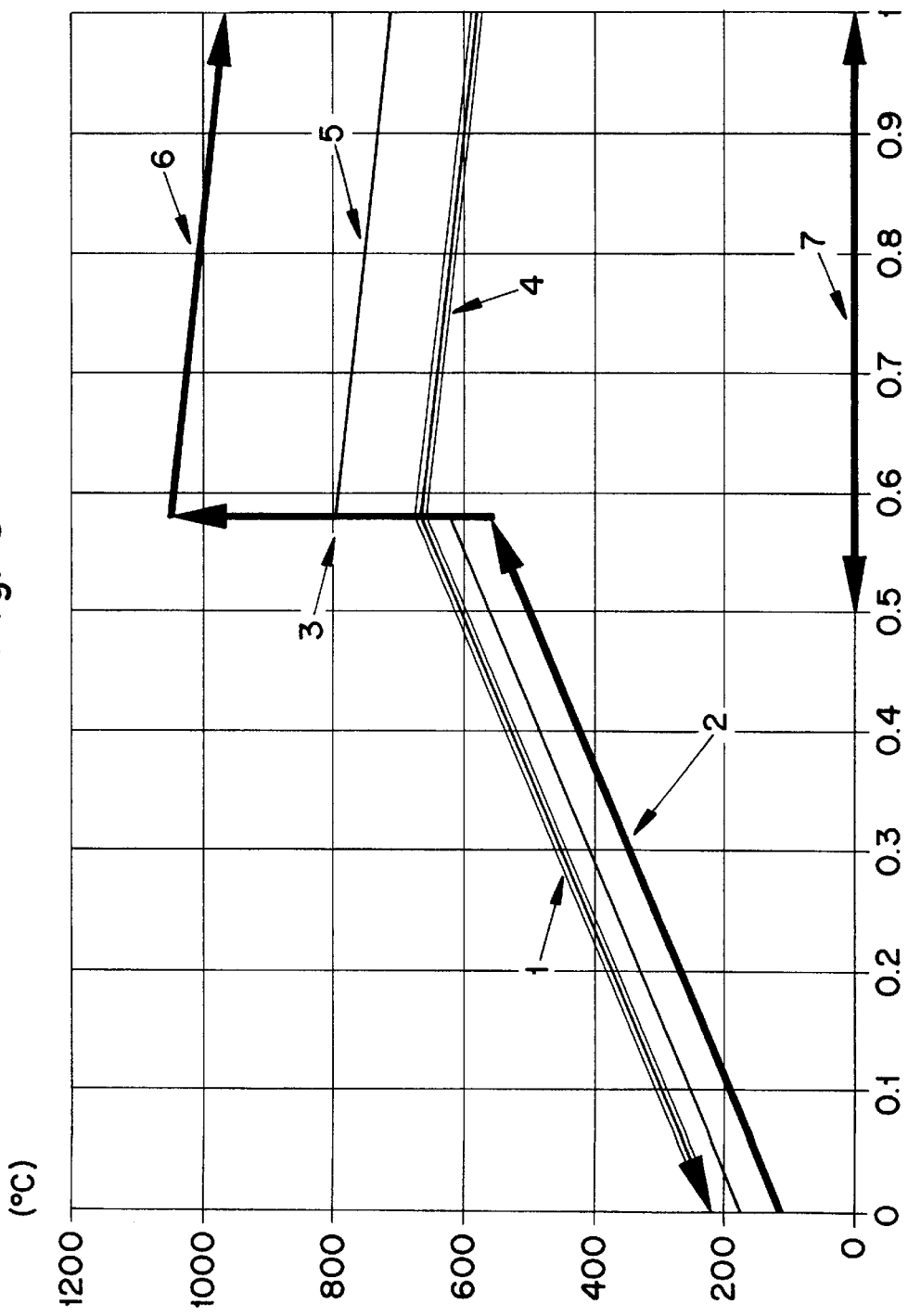
FIG. 3 shows a diagram of a typical temperature characteristic inside the combination according to the invention of heat exchanger and combustion chamber for the limit case of rapid heat release.

Referring now to the drawings, wherein like reference numerals designate identical or corresponding parts throughout the several views, FIG. 1a shows for the prior art the conventional construction of a gas-turbine arrangement, as outlined in the introduction to the description. It is essential here that the heat exchanger W and the combustion chamber B are designed as two separate units, which in the case of the arrangement according to the invention are designed as a common unit E according to FIG. 1b. The supply air L and the gaseous fuel GB are mixed with one another upstream of the compressor stage V and are accordingly compressed in the compressor. According to the invention, the compressed air/fuel mixture now passes directly into the combination unit E according to the invention, which, as shown in FIG. 2, has feeding ducts which are coated with a catalyst material K and in which the air/fuel mixture is heated and made to ignite. The resulting hot gases pass into the turbine T in order to drive the latter, which is connected to a generator G in a manner known per se. The hot combustion gases VG issuing from the turbine T are accordingly directed into the unit E in order to heat the air/fuel mixture directed into the unit E according to the invention.

A typical cross section through the unit E according to the invention, consisting of the combination of a heat exchanger and a combustion chamber, is shown in FIG. 2. The ducts ZK feeding the air/fuel mixture LBG are each surrounded by heat-exchanger walls WW which have suitably selected thermal coupling properties and are coated with a catalytic material K on the inside. Between the feeding ducts ZK, the plate-shaped stack arrangement provides exhaust-gas return ducts AK, which are each directly surrounded by the heat-exchanger walls WW. In this way, direct heat transfer is effected from the hot combustion gases VG, returned into the exhaust-gas return ducts AK, via the heat-exchanger wall WW to the catalyst coating K, which transmits the heat directly to the compressed air/fuel mixture LBG.

In the case of the arrangement shown in FIG. 2, the compressed air/fuel mixture LBG flows through the feeding ducts ZK from left to right, whereas the combustion gases VG pass through the exhaust-gas return ducts AK from right to left. As a result of the direct heat transfer, the regions of the feeding ducts ZK which are nearest to the feeding side of the combustion gases VG (here the right-hand side of the representation) are heated the most. As a result of the temperature gradient forming along the feeding ducts ZK, the air/fuel mixture is ignited in that region of the feeding duct in which the catalyst coating K exceeds the ignition temperature of the combustible mixture, resulting in hot gases HG, which are fed directly to the turbine. Typical ignition temperatures lie within a range above 500° C.

The combination according to the invention of heat exchanger and catalytically ignited and assisted fuel transformation avoids in particular the two greatest disadvantages in the case of catalytic burners known per se.

On the one hand, the minimum temperature of about 500° C. required to activate the catalyst is automatically achieved by the heat transfer on the basis of convective air preheating via the heat-exchanger walls. During possible load changes of the turbine, which may lead to fluctuations in the temperature of the combustion gases, the zone in which the air/fuel mixture is ignited is displaced along the feeding ducts ZK, yet the reliable catalytically initiated ignition is not put at risk as long as the end, i.e. the inlet opening, of the feeding duct is not reached by the ignition temperature.

It has been found that, assuming appropriate parameters for the operation of gas turbines, the ignition temperature is only reached in the medium and upper load range of a gas turbine. Since combined heat and power plants on a gas-turbine basis are in any case only operated at high load for reasons of efficiency, the limit of the operating principle does not constitute a relevant restriction. The starting of the gas-turbine arrangement having the combination according to the invention of heat exchanger and combustion chamber can be carried out, for example, with the aid of an auxiliary burner, which heats the outlet region of the feeding ducts in such a way that the ignition temperature is reached in this region.

The second problem of those referred to above in the case of conventional catalytic combustion is the rapid destruction of the catalyst as well as its backing at temperatures above 800° C.

In principle, temperatures around 950° C. or higher, as are necessary for thermodynamic efficiencies of around 40%, require a secondary combustion stage, which is very expensive with regard to the complexity and the NO emission and is consequently disadvantageous. The combination of heat transfer and combustion within one unit also leads quite automatically to cooling of the catalyst as soon as the temperature of the combustion process rises above that of the combustion gases coming from the turbine. Thus the wall temperature is to be limited to about 800° C. by suitable selection of the thermal heat transfers to the heat-exchanger walls. These circumstances are shown in detail with reference to FIG. 3.

The abscissa of the diagram indicates the length of the feeding duct ZK. The temperatures occurring in the feeding duct ZK are indicated in ° C. on the ordinate. The arrows plotted by a thick line indicate the temperature characteristic of the air/fuel mixture LBG. The somewhat thinner continuous black line indicates the behavior of the wall temperature of the heat exchanger. The triple arrow line corresponds to the temperature behavior of the combustion gases coming from the turbine. The temperature characteristic assumed in FIG. 3 is based on the assumption that the heat release of the hot gas resulting from the combustion of the air/fuel mixture is effected extremely rapidly.

Furthermore, in FIG. 3 the region of the feeding ducts which is coated on the inside with catalytic material is indicated on the abscissa between the values 0.5 and 1. Due to the heating of the hot combustion gases VG coming from the turbine, the ignition temperature is reached between 0.5 and 0.6 of the length of the feeding ducts, as a result of which the temperature inside the feeding ducts rises abruptly. It becomes clear that, at high firing temperatures, first of all up to ignition, heat is transferred from the combustion gases to the air/fuel mixture. After the heat release by the ignition of the air/fuel mixture, a heat flow to the combustion gases coming from the turbine is obtained, as a result of which the preheating output of the combustion gases is improved. In this case, the peak temperature of the hot gases produced inside the feeding ducts after the ignition is higher than the turbine inlet temperature, as a result of which the CO oxidation is improved. However, the limit for the NO formation, which is reached at temperatures of over 1300° C., is not reached with the device according to the invention.

Figure 4:
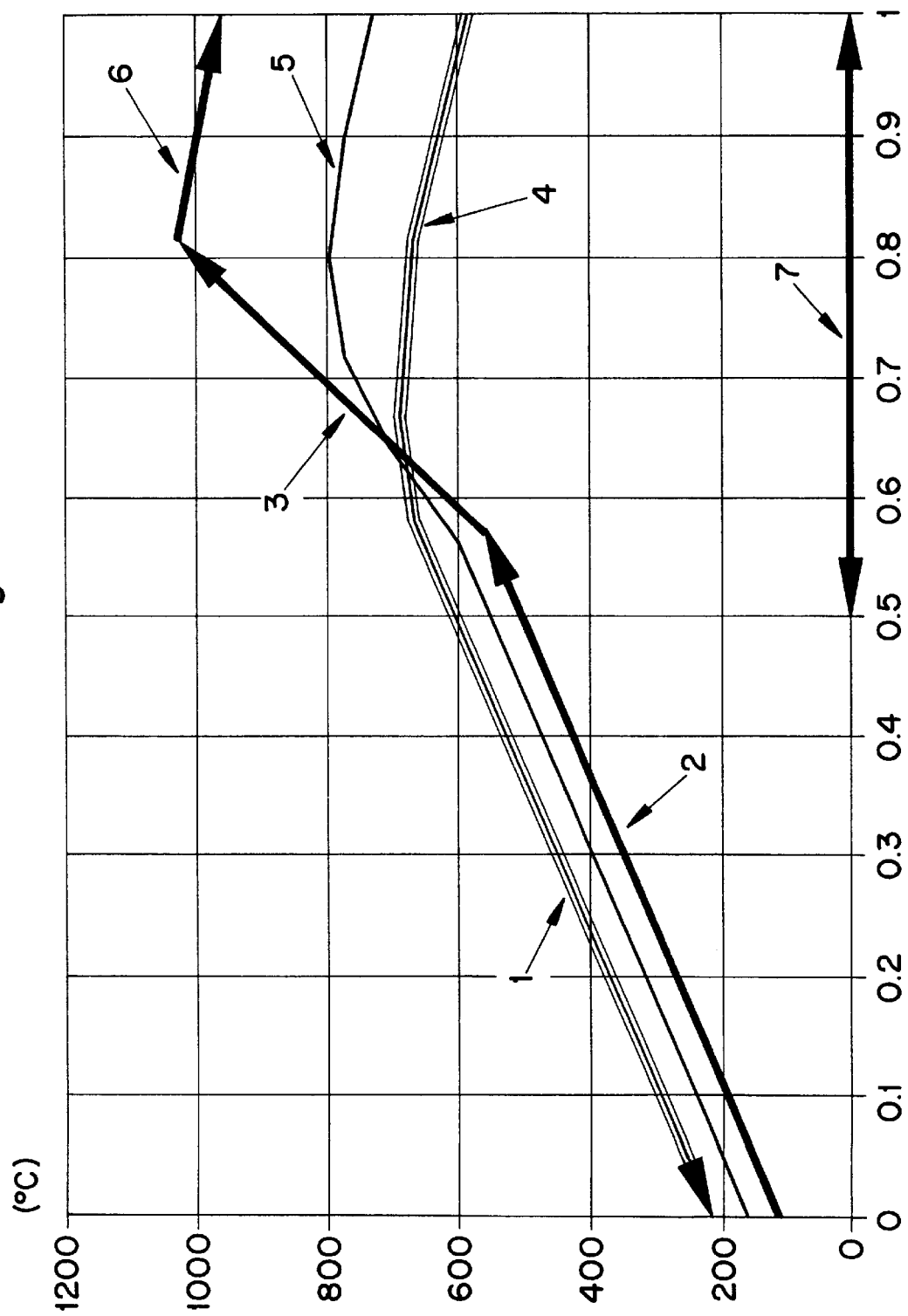
FIG. 4 shows a diagram of a typical temperature characteristic inside the combination according to the invention of heat exchanger and combustion chamber in the case of slow catalytic heat transformation.

As already mentioned above, the ignition and combustion action is assumed to be extremely rapid in FIG. 3. However, if the air/fuel mixture is too lean for high transformation in the gas phase after catalytic ignition, the ignition reaction takes place in such a way as to be spread over the feeding duct in the direction of the turbine side. This case is shown schematically in FIG. 4, which otherwise shows the same diagram allocation as described in FIG. 3.

An especially advantageous property of the catalytic combination according to the invention of heat exchanger and combustion chamber is the capability, by contrast with homogeneous gas-phase combustion, of also being able to ignite and transform very lean mixtures. In the operating range, therefore, the production of NO can be almost completely prevented or avoided without complex stepping arrangements, as known from lean premixing techniques.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A gas turbine construction having an air compressor, a heat exchanger connected downstream of the air compressor, a combustion chamber, and a turbine which can be driven by hot combustion gases and from which the combustion gases are fed to the heat exchanger for heating compressed supply air coming from the air compressor, wherein the heat exchanger and the combustion chamber are integrated in a common unit, and wherein fuel can be added to the supply air before entry in the unit, which fuel can be ignited catalytically in the form of an air/fuel mixture inside the unit, in which a catalyst is provided;

the unit comprising of heat exchanger and combustion chamber provides at least one duct which feeds the air/fuel mixture to the turbine and is thermally coupled to at least one exhaust-gas return duct carrying off the combustion gases; and wherein the duct feeding the air/fuel mixture is provided, at least partly, with a catalyst material on the inside.

2. The gas-turbine construction as claimed in claim 1, wherein the catalyst material (K) is platinum.

3. The gas-turbine construction as claimed in one of claim 1, wherein the fuel can be admixed with the supply air upstream of the air compressor.

4. The gas-turbine construction as claimed in one of claim 1, wherein the fuel can be admixed with the compressed supply air by means of an injection nozzle downstream of the air compressor and upstream of the unit.

5. The gas-turbine construction as claimed in one of claim 1, wherein the duct feeding the air/fuel mixture to the turbine and the exhaust-gas return duct carrying off the combustion gases are arranged in layers like a plate-type heat exchanger.

6. The gas-turbine construction as claimed in claim 5, wherein a multiplicity of repetitive layers consisting of feeding duct and exhaust-gas return duct are provided.

7. The gas-turbine construction as claimed in one of claim 1, wherein the feeding duct consists of a heat-exchanger wall enclosing the duct and having a catalyst coating surrounding the heat-exchanger wall on the inside, and the exhaust-gas return duct is enclosed by heat-exchanger walls of two adjacent feeding ducts.

8. The gas-turbine construction as claimed in one of claim 1, wherein the unit is of elongated design, having an inlet side for the air/fuel mixture and an outlet side facing turbines, the catalyst being provided in the feeding duct at least in the region of the outlet side, which faces the turbines.

9. A method of operating the gas-turbine construction as claimed in one of claim 1, wherein the waste heat of the combustion gases is utilized in order to reach the ignition temperature of the air/fuel mixture directed into the unit, and this waste heat heats the catalyst to the ignition temperature via thermal coupling.

10. The method as claimed in claim 9, wherein, after the ignition temperature, which, for instance, is about 500° C., has been reached, a heat transfer takes place from the ignited air/fuel mixture inside the feeding duct to the combustion gases flowing around the duct, as a result of which the catalyst is cooled in the duct region in which the air/fuel mixture is ignited, and the preheating output of the combustion gases is increased.

11. The method as claimed in claim 9, wherein the spatial ignition region inside the feeding duct is established by selection of the mixing ratio of the air/fuel mixture.

* * * * *